(12) United States Patent
Chari et al.

(10) Patent No.: US 7,777,416 B2
(45) Date of Patent: Aug. 17, 2010

(54) LIGHT EMITTING DEVICE WITH MICROLENS ARRAY

(75) Inventors: Krishnan Chari, Fairport, NY (US);
Charles W. Lander, Wayland, NY (US);
Liang-Sheng Liao, Rochester, NY (US);
Paul D. Yacobucci, Rochester, NY (US)

(73) Assignee: Global Oled Technology LLC, Wilmington, DE (US)

( * ) Notice: Subject to any disclaimer, the term of this patent is extended or adjusted under 35 U.S.C. 154(b) by 534 days.

(21) Appl. No.: 11/763,264

(22) Filed: Jun. 14, 2007

(65) Prior Publication Data
US 2008/0310186 A1 Dec. 18, 2008

(51) Int. Cl.
*H01J 1/62* (2006.01)
(52) U.S. Cl. ............... 313/512; 362/308; 313/504
(58) Field of Classification Search ......... 313/506–512; 362/308
See application file for complete search history.

(56) References Cited

U.S. PATENT DOCUMENTS

| | | | |
|---|---|---|---|
| 4,476,292 A | 10/1984 | Ham et al. | |
| 4,769,292 A | 9/1988 | Tang et al. | |
| 5,247,190 A | 9/1993 | Friend et al. | |
| 6,700,702 B2 | 3/2004 | Sales | |
| 6,859,326 B2 | 2/2005 | Sales | |
| 2004/0189185 A1 | 9/2004 | Yotsuya | |

OTHER PUBLICATIONS

S. Möller et al; *Journal of Applied Physics*; "Improved Light Out-Coupling in Organic Light Emitting Diodes Employing Ordered Microlens Array"; vol. 91; No. 5; 2002; pp. 3324-3327.
Huajun Peng et al; *Journal of Display Technology*; "Coupling Efficiency Enhancement in Organic Light-Emitting Devices Using Microlens Array-Theory and Experiment"; vol. 1; No. 2; 2005; pp. 278-282.

(Continued)

*Primary Examiner*—Joseph L Williams
(74) *Attorney, Agent, or Firm*—McKenna Long & Aldridge LLP

(57) ABSTRACT

A method of manufacturing a micro-lens array and light-emitting device, including forming a first structured polymer film with close packed surface cavities having a mean diameter of less than 20 micrometers and a relatively lower surface energy surface, forming a transparent second structured film with an array of microlenses formed thereon corresponding to the cavities of the first structured film, wherein the second structured film includes a relatively high surface energy material and has a refractive index greater than 1.45, and wherein the microlenses are randomly distributed, separating the second structured film with the micro-lens array from the first structured polymer film, and attaching the second structured film to a transparent substrate or cover of a light-emitting device through which light is emitted. Use of microlens arrays formed from relatively high surface energy materials enables matching refractive index of microlens array to that of light-emitting devices substrate or cover through which light is emitted and relatively high elastic modulus providing good scratch resistance.

6 Claims, 8 Drawing Sheets

OTHER PUBLICATIONS

Mohan Srinivasarao et al; *Reports*; "Three-Dimensionally Ordered Array of Air Bubbles in a Polymer Film"; vol. 292; 2001; pp. 79-83.

Yiru Sun et al; *Journal of Applied Physics*; "Organic Light Emitting Devices With Enhanced Outcoupling Via Microlenses Fabricated by Imprint Lithography"; vol. 100; 2006; pp. 073106-1-073106-6.

C. W. Tang et al; *Journal of Applied Physics*; "Electroluminescence of Doped Organic Thin Films"; vol. 65; No. 9; 1989; pp. 3610-3636.

C. W. Tang et al; *Applied Physics Letter*; "Organic Electroluminescent Diodes"; vol. 51; No. 12; 1987; pp. 913-915.

Hiroshi Yabu et al; *Langmuir*; "Simple Fabrication of Micro Lens Arrays"; vol. 21; 2005; pp. 1709-1711.

U.S. Appl. No. 11/741,472, filed Apr. 27, 2007; titled "Light Emitting Device With Microlens Array"; of Krishnan Chari et al.

U.S. Appl. No. 11/763,307, filed Jun. 14, 2007; titled Anamorphic Microlens Array; of Krishnan Chari et al.

LIGHT EMITTING DEVICE WITH MICROLENS ARRAY

FIELD OF THE INVENTION

This invention relates to a light-emitting device having a micro-lens array, and more particularly to self-emissive light-emitting devices having a high fill-factor micro-lens array in optical contact with a transparent substrate or cover of the light-emitting device, and a method of fabricating the high fill-factor micro-lens array.

BACKGROUND OF THE INVENTION

Light-emitting devices comprising self-emissive thin film light emitting elements such as organic light emitting diodes (OLEDs) represent an attractive technology for flat panel display and solid-state lighting. OLED devices generally can have two formats known as small molecule devices such as disclosed in U.S. Pat. No. 4,476,292 and polymer OLED devices such as disclosed in U.S. Pat. No. 5,247,190. Either type of OLED device may include, in sequence, an anode, an organic EL element, and a cathode. The organic EL element disposed between the anode and the cathode commonly includes an organic hole-transporting layer (HTL), an emissive layer (EL) and an organic electron-transporting layer (ETL). Holes and electrons recombine and emit light in the EL layer. Tang et al. (Appl. Phys. Lett., 51, 913 (1987), Journal of Applied Physics, 65, 3610 (1989), and U.S. Pat. No. 4,769,292) demonstrated highly efficient OLEDs using such a layer structure. Since then, numerous OLEDs with alternative layer structures, including polymeric materials, have been disclosed and device performance has been improved.

Light is generated in an OLED device when electrons and holes that are injected from the cathode and anode, respectively, flow through the electron transport layer and the hole transport layer and recombine in the emissive layer. Many factors determine the efficiency of this light generating process. For example, the selection of anode and cathode materials can determine how efficiently the electrons and holes are injected into the device; the selection of ETL and HTL can determine how efficiently the electrons and holes are transported in the device, and the selection of EL can determine how efficiently the electrons and holes be recombined and result in the emission of light, etc. It has been found, however, that one of the key factors that limits the efficiency of OLED devices is the inefficiency in extracting the photons generated by the electron-hole recombination out of the OLED devices. Due to the high optical indices of the organic materials used, most of the photons generated by the recombination process are actually trapped in the devices due to total internal reflection. These trapped photons never leave the OLED devices and make no contribution to the light output from these devices.

A typical OLED device uses a glass substrate, a transparent conducting anode such as indium-tin-oxide (ITO), a stack of organic layers, and a reflective cathode layer. Light generated from the device is emitted through the glass substrate. This is commonly referred to as a bottom-emitting device. Alternatively, a device can include a substrate, a reflective anode, a stack of organic layers, a top transparent cathode layer, and a transparent encapsulating cover. Light generated from the device is emitted through the top transparent electrode and encapsulating cover. This is commonly referred to as a top-emitting device. In these typical devices, the index of the ITO layer, the organic layers, and the glass is about 2.0, 1.7, and 1.5 respectively. It has been estimated that nearly 60% of the generated light is trapped by internal reflection in the ITO/organic EL element, 20% is trapped in the glass substrate, and only about 20% of the generated light is actually emitted from the device and performs useful functions. Thus, it can be seen that a major shortcoming of OLEDs is that only a small fraction of light generated in the organic layers is emitted from the device. A significant amount of light is trapped by total internal reflection (TIR) because of the relatively large differences in refractive index at the anode-substrate and substrate-air interfaces.

Methods for improving the extraction or out-coupling of light from OLEDs are known in the art. A number of approaches have focused on the substrate-air interface. For example, Moller and Forrest (Journal of Applied Physics, volume 91, page 3324, March 2002 incorporated here as reference) have demonstrated an increase in light output by a factor or 1.5 by attaching a micro-lens array to the glass substrate of an OLED. But there are significant problems with this approach. Preparation of the micro-lens array is by a complex multi-step process involving chemical vapor deposition, photolithography and chemical etching. Also, the micro-lenses do not have the optimum shape. Calculations by Peng et al. (Journal of Display Technology, volume 1, page 278, December 2005 incorporated here as reference) indicate that micro-lenses should have perfectly hemispherical shape for maximum light extraction. Peng et al. describe a process for fabrication of a micro-lens array based on coating a thin layer of photo-resist material on a glass substrate followed by patterning the photo-resist by conventional lithography and then modifying the shape of the photo-resist disks by melting and re-flow. Although the process is an improvement over the method of Moller and Forrest that is reflected in higher light extraction, a factor of 1.85 versus 1.5; there are still problems to be overcome. Melting and re-flow of the photo-resist is difficult to control resulting in significant deviations from hemispherical shape. Furthermore, the distance between lenses is fixed at 1 µm because a smaller spacing or higher resolution is difficult to obtain using this process that is characteristic of "top-down" or conventional micro-fabrication technology. The minimum spacing of 1 µm limits the area fill factor to less than 0.80 for a hexagonally close packed array of hemispherical micro-lenses having diameters of less than 20 micrometers, where the fill factor is defined as the ratio of the area occupied by the micro-lenses to the total area of the surface. Clearly, it is desirable to have a micro-lens array with fill factor close to unity to achieve maximum light extraction.

US2004/0189185 also teaches an OLED device with a micro-lens array. However, once again the micro-lens array is fabricated by conventional micro-fabrication methods such as wet etching and photo-resist re-flow that have the same disadvantages as noted above.

Sun and Forrest (Journal of Applied Physics, volume 91, pages 073106-1 to 073106-6, published online Oct. 11, 2006) describes an OLED device with microlenses fabricated by imprint lithography, wherein a negative microlens array pattern is etched into a glass mold, which is used to imprint a microlens array in a polymethylmethacrylate layer spun-coated on an OLED glass substrate. The described process enables a microlens array to be formed with PMMA, which has a refractive index closely matched to the glass substrate, and a desirably high elastic modulus providing improved scratch resistance compared to previously described microlens arrays formed from PDMS. Formation of a close packed hexagonal array consisting of 6.6 micrometer diameter by 2.2 micrometer high microlenses is reported.

Yabu and Shimomura (Langmuir, volume 21, page 1709, 2005) describe an alternative approach for preparing micro-lens arrays. In this process, a solution of polymer in a volatile organic solvent is cast under humid conditions. Evaporation of the organic solvent under the same humid conditions followed by subsequent evaporation of condensed water droplets from the cast composition results in a polymer film containing a uniform closely packed three dimensional network of spherical pores. A close-packed array of pillar structures is then generated by peeling off the top layer of the film with spherical pores. A polymeric material is subsequently coated over the pillar structure, cured and then released to form a micro-lens array. Yabu and Shimomura do not quantify the fill factor or the shapes of the individual micro-lenses in the array. Furthermore, they do not discuss the effectiveness of the micro-array for light extraction from OLEDs. Also, fabrication of the array involves a large number of steps that may not be suitable for low-cost high volume manufacturing. A simple process requiring less number of steps leading to micro-lens arrays having a high fill factor and hemispherical shaped micro-lenses and the integration of such arrays with OLEDs is still needed.

An additional problem with the micro-lens array of Yabu and Shimomura and other micro-lens arrays in the prior art is that the micro-lens array comprises a precisely ordered array of lenses. An ordered array of lenses in an OLED display can cause significant diffractive artifacts from intense ambient point sources, such as sunlight, or incandescent lamps. It would be desirable to have OLED devices with integrated micro-lens arrays wherein the lenses in the micro-lens arrays are close-packed but randomly distributed.

Srinivasarao et al. (Science, volume 292, page 79, 2001) also describe a process for creating a micro-voided polymer film that involves casting a solution of polymer in a volatile organic solvent in the presence of moist air. Srinivasarao et al. indicate that the shape of the micro-voids in the polymer film depends on the density of the volatile organic solvent relative to water. A film with a three dimensional network of spherical pores as obtained by Yabu and Shimomura is formed if the solvent is less dense than water whereas a film containing only surface cavities is obtained if the solvent has a higher density than water. Srinivasarao mention polymers such as polystyrene containing an end-terminated carboxylic acid group, cellulose acetate and polymethylmethacrylate as being suitable polymers for forming the micro-voided polymer films but do not mention any specific properties to guide the selection of polymers. Furthermore, Srinivasarao et al. do not teach how the micro-voided polymer films are to be used for preparing micro-lens arrays for improved light extraction in OLEDs.

Copending U.S. Ser. No. 11/741,472, the disclosure of which is incorporated by reference herein, describes a simple method for preparing microlens array films with hemispherical shaped microlenses and high fill factor. The process involves forming a solution of an organic solvent polymer in a volatile water-immiscible organic solvent having specific gravity greater than that of water, casting the solution in a humid environment and condensing water droplets on the cast solution, evaporating off the solvent and condensed water droplets to create a first structured polymer film, coating a second fluid polymer composition over the first structured polymer film, curing the second polymer fluid composition while it is in contact with the first structured film to render it solid and create a second structured film comprising a first flat side and a second side with an array of microlenses corresponding to the cavities in the first structured film, separating the second structured film from the first structured film and attaching the flat side of the second structured film to a transparent substrate of a light-emitting device. While the disclosed process produces a microlens array with high fill factor and a random distribution of microlenses having nearly hemispherical shape, the material employed for formation of the second structured film in the disclosed examples has a high hydrophobicity and low surface energy in order to facilitate separation of the cured second structured film from contact with the first structured film. Elastomeric materials such as silicones or natural rubber that are hydrophobic and have low surface energy, however, may not have desirable optical properties in terms of refractive index or light transmission or physical properties in terms of scratch resistance. While it is possible to chemically treat and modify the surface of the first structured film (after it has been prepared and before the second fluid composition is applied on it) to allow materials that are hydrophilic and high surface energy to be released from it, this involves several additional process steps that are not desirable.

An object of this invention is to provide a light-emitting device, such as an OLED device comprising a transparent substrate or cover through which light is emitted, with a micro-lens array having refractive index closely matched to that of the transparent substrate or cover, wherein the micro-lens array has a high fill factor of relatively small microlenses that are randomly distributed, wherein the microlens array is obtainable by a simple low-cost method and the light emitting device demonstrates high light output.

SUMMARY OF THE INVENTION

In accordance with one embodiment, the invention is directed towards a method of manufacturing a micro-lens array and light-emitting device comprising a) forming a solution of an organic soluble copolymer or polymer blend comprising a hydrophilic, high surface energy component in combination with a hydrophobic, low surface energy component in a volatile water-immiscible organic solvent having specific gravity greater than that of water, b) casting the solution in a humid environment, and condensing water droplets on the cast solution, c) evaporating off the solvent and condensed water droplets from the cast composition to create a first structured polymer film with close packed surface cavities having a mean diameter of less than 20 micrometers, d) annealing the first structured polymer film at elevated temperature to achieve chemical re-construction to modify the surface of the first structured polymer film and obtain a relatively lower surface energy surface, e) coating a second fluid polymer composition over the first structured polymer film, f) curing the second fluid polymer composition while it is still in contact with the first structured polymer film to render it solid and create a transparent second structured film comprising a first flat side and a second side with an array of microlenses formed thereon corresponding to the cavities of the first structured film, wherein the second structured film comprises a relatively high surface energy material and has a refractive index greater than 1.45, and wherein the microlenses are randomly distributed over 300 μm×300 μm areas of the second structured film, g) separating the second structured film with the microlens array from the first structured polymer film, and h) attaching the flat side of the second structured film to a transparent substrate or cover of a light-emitting device through which light is emitted.

In accordance with a further embodiment, the invention is directed towards a light-emitting device, comprising: a light emitting element on a first side of a transparent substrate or cover through which light is emitted; and a microlens array on a second side, opposite to the first side, of the transparent substrate or cover though which light is emitted; wherein the microlens array has a refractive index greater than 1.45 and an elastic modulus of at least 1,000 kPa and comprises individual microlenses having a mean diameter of less than 20 micrometers that are randomly distributed over 300 μm×300 μm areas of the microlens array.

The required first structured polymer film with cavities is formed directly upon evaporation of the organic solvent and condensed water droplets from the cast composition, and does not require additional steps as in prior art processes. Furthermore, chemical re-construction of the surface of the first structured film is easily accomplished by simply annealing the film at elevated temperature to create a relatively lower surface energy non-stick surface that allows materials with desired optical and physical properties to be easily released from it. A micro-lens array with the desired features in terms of high fill factor, high refractive index, high elastic modulus, and random distribution of the microlenses may be obtained from this micro-voided film in a straightforward manner.

Figure 1:
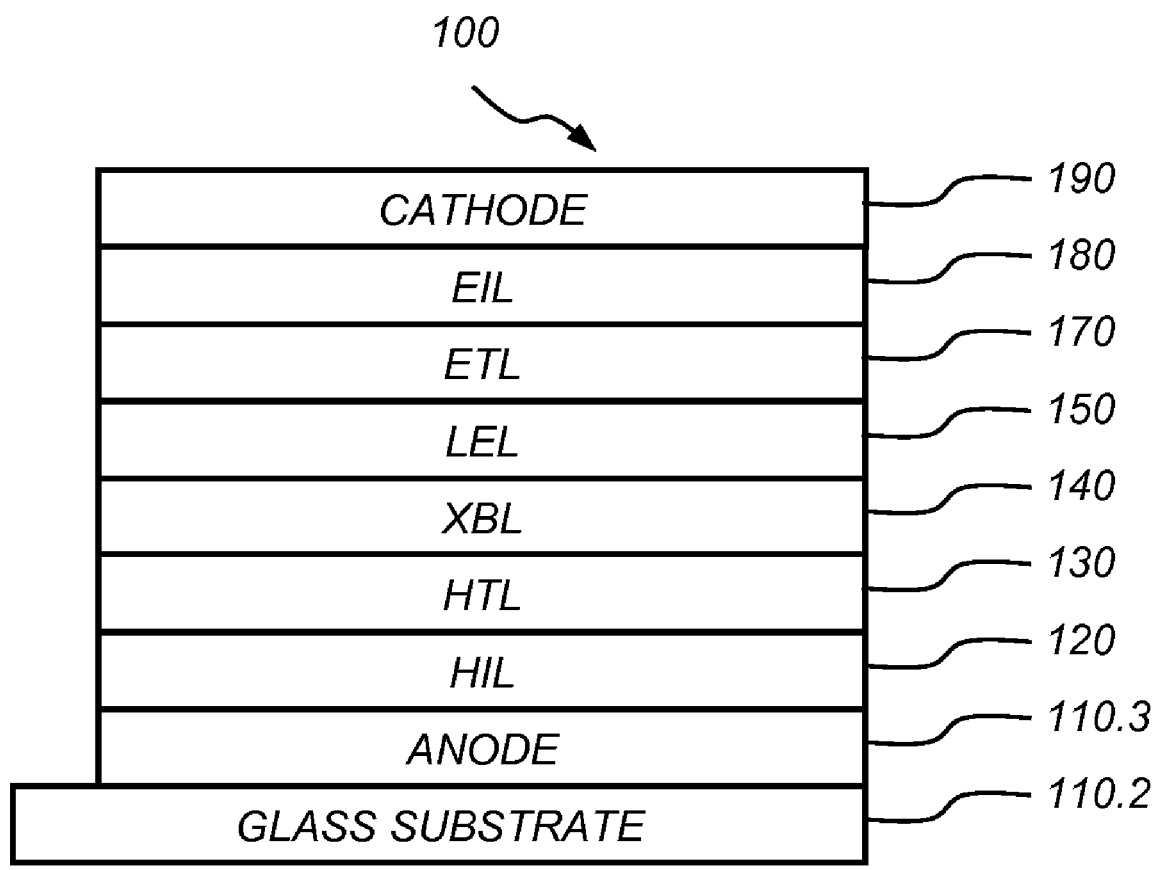
FIG. 1 shows a cross-sectional view of a prior art organic light-emitting diode (OLED) without a microlens array layer.
Figure 2:
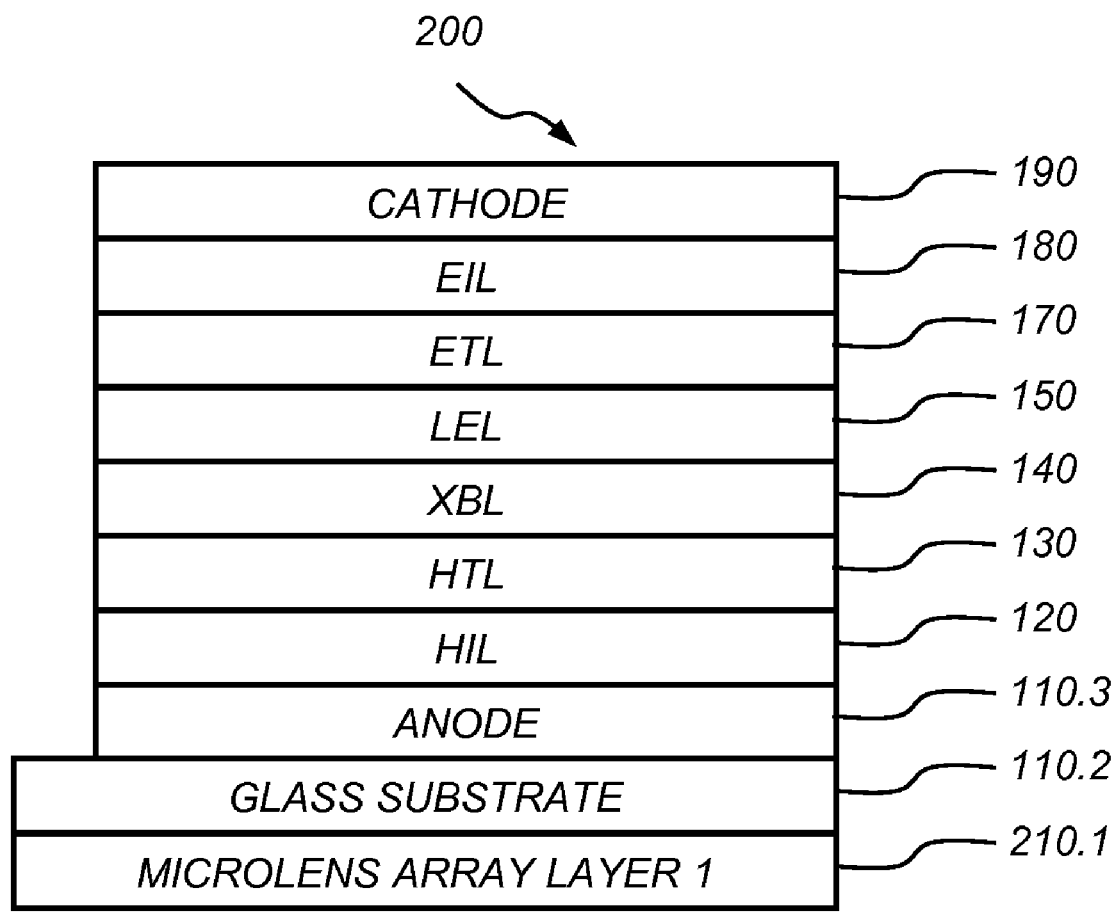
FIG. 2 shows a cross-sectional view of an OLED having a microlens array layer.
Figure 3:
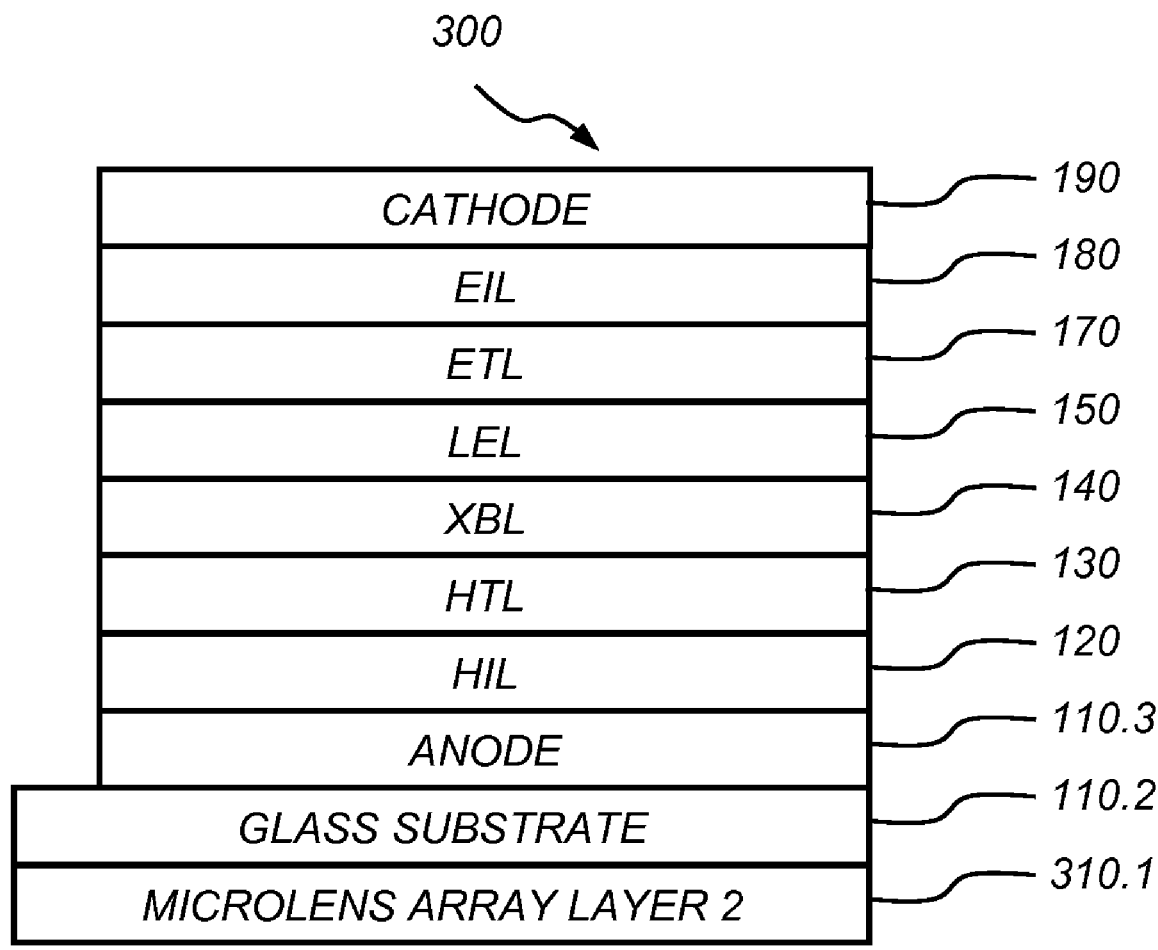
FIG. 3 shows a cross-sectional view of one embodiment of an OLED prepared in accordance with the present invention.

It will be understood that FIGS. 1-3 are not to scale since the individual layers are too thin and the thickness differences of various layers are too great to permit depiction to scale.

DETAILED DESCRIPTION

Microlens arrays as employed in combination with light emitting devices in the present invention may be formed by forming a solution of an organic soluble polymer comprising a copolymer or polymer blend with defined surface energy and wetting properties, preferably along with a fluorocarbon surfactant, in a volatile water-immiscible organic solvent having density greater than that of water, casting this solution in a humid environment, evaporating off the solvent and condensed water droplets from the cast composition to create a first structured polymer film with surface cavities, annealing the first structured polymer film at elevated temperature to achieve chemical re-construction of the surface of the film, coating a second fluid polymer composition over the first structured polymer film, curing the second fluid polymer composition while it is still in contact with the first structured polymer film to render it solid and create a transparent second structured film comprising a first flat side and a second side with an array of microlenses formed thereon corresponding to the cavities of the first structured film, and separating the second structured film with the micro-lens array from the first structured polymer film. The resulting microlens array may then be attached to a transparent substrate or cover of a light emitting device through which light is emitted, such as an OLED device, to form a device in accordance with the invention. As the first structured polymer film is directly formed from a copolymer or polymer blend that forms a relatively low surface energy surface upon annealing, the microlens array may be formed with a relatively higher surface energy material, thereby also enabling use of a material having a desirably high refractive index such that it may be closely matched to that of the substrate or cover of the light-emitting device. Such relatively higher surface energy materials may also have a desirably high elastic modulus, providing improved scratch resistance.

Suitable materials for the organic soluble polymer used for preparing the first structured polymer film are copolymers or polymer blends comprising a mixture of a hydrophilic (and high surface energy) component and a hydrophobic (and low surface energy) component. The surface energy of the hydrophilic (and high surface energy component) is suitably greater than 30 dynes/cm and more suitably greater than 35 dynes/cm. The contact angle that a drop of water makes with the surface of the hydrophilic component is suitably between 50 and 90 degrees and more suitably between 60 and 80 degrees. The surface energy of the hydrophobic (and low surface energy) component is suitably less than 30 dynes/cm and more suitably less than 25 dynes/cm to allow a second structured polymer film to be easily released from it by peeling off and enable the creation of a microlens array with individual lenses closely conforming to the tightly packed arrangement of the cavities of the first structured film employed as a mold. It is also desired that the surface properties of the hydrophobic component is such that a drop of water placed on it will have a contact angle in excess of 90 degrees.

Suitable materials for the organic soluble polymer are copolymers wherein one of the components of the copolymer is a hydrophilic segment such as polystyrene, polyester, polyethyleneterephthalate (PET), polyvinylchloride (PVC), polycarbonate, polyimide, polysulfone, polyethersulfone, bisphenol A polycarbonate (BPAC) or nylon and the second component is a hydrophobic segment such as polydimethylsiloxane (PDMS) or a fluorinated material such as fluorinated ethylene propylene or polyvinylfluoride. The copolymers may be either random or block copolymers such as di-block or tri-block copolymers. Particularly suitable are copolymers containing polystyrene and PDMS or copolymers containing bisphenol A polycarbonate (BPAC) and PDMS. Each PDMS block in the copolymer suitably contains between 2 and 40 repeat units of dimethylsiloxane and more suitably between 15 and 25 units of dimethylsiloxane. The proportion of PDMS in the copolymer is suitably between 0.5 mol % and 20 mol % and more suitably between 1 mol % and 10 mol %. The average molecular weight of the copolymer is suitably in the range of 20,000 to 500,000.

Also suitable as materials for the organic soluble polymer are blends of a hydrophilic polymer such as polystyrene, polyester, polyethyleneterephthalate (PET), polyvinylchloride (PVC), polycarbonate, polyimide, polysulfone, polyethersulfone, bisphenol A polycarbonate (BPAC) or nylon and a hydrophobic polymer such as polydimethylsiloxane (PDMS) or a fluorinated material such as fluorinated ethylene propylene or polyvinylfluoride. Most suitable are blends of polystyrene and PDMS or polycarbonate and PDMS. The proportion of PDMS in the blend is suitably between 0.5 mol % and 20 mol % and more suitably between 1 mol % and 10 mol %.

To facilitate formation of closely packed hemispherical structures in the surface of the first structured polymeric film, a fluorocarbon surfactant is preferably used in conjunction with the organic soluble polymer in the method of the invention. Fluorocarbon surfactants are a class of surfactants wherein the hydrophobic part of the amphiphile comprises at least in part some portion of a carbon-based linear or cyclic moiety having fluorines attached to the carbon where typically hydrogens would be attached to the carbons together with a hydrophilic head group. Some typical non-limiting fluorocarbon surfactants include fluorinated alkyl polyoxyalkylene and fluorinated alkyl esters as well as ionic surfactants. Representative structures for these compounds are given below:

(I) $R_fR(R_1O)_xR_2$
(II) $R_fR—OC(O)R_3$
(III) $R_fR—Y—Z$
(IV) $R_fRZ$ wherein $R_f$ contains from 6 to about 18 carbons each having from about 0 to about 3 fluorines attached. R is either an alkyl or alkylene oxide group which when present, has from about 1 to about 10 carbons and $R_1$ represents an alkylene radical having from about 1 to 4 carbons. $R_2$ is either a hydrogen or a small alkyl capping group having from 1 to about 3 carbons. $R_3$ represents a hydrocarbon moiety comprising from about 2 to 22 carbons including the carbon on the ester group. This hydrocarbon can be linear, branched or cyclic saturated or unsaturated and may contain moieties based on oxygen, nitrogen and sulfur including, but not limited to ethers, alcohols, esters, carboxylates, amides, amines, thio-esters, and thiols; these oxygen, nitrogen and sulfur moieties can either interrupt the hydrocarbon chain or be pendant on the hydrocarbon chain. In the third structure above, Y represents a hydrocarbon group that can be an alkyl, pyridine group, amidopropyl, etc that acts as a linking group between the fluorinated chain and the hydrophilic head group. In the third and fourth structures, Z represents a cationic, anionic and amphoteric hydrophilic head group including but not limited to carboxylates, sulfates, sulfonates, quaternary ammonium groups and betaines. Non-limiting commercially available examples of these structures include Zonyl 9075, FSO, FSN, FS-300, FS-310, FSN-100, FSO-100, FTS and TBC from DuPont and Fluorad surfactants FC430, FC431, FC-740, FC-99, FC-120, FC-754, FC-170C and FC-171 from 3M in St. Paul, Minn.

Suitable solvents for the organic soluble polymer and the fluorocarbon surfactant are halogen based organic solvents such as chloroform, dichloromethane and dichloroethane; aromatic hydrocarbons such as benzene, toluene and xylene; esters such as ethyl acetate and butyl acetate; water insoluble ketones such as methyl isobutyl ketone; and carbon disulfide. The organic solvents may be used alone or in the form of a mixed solvent comprising a combination of two or more. In order to form hemispherical cavities only on the surface of the first structured film, the organic solvent should have a specific gravity greater than 1.0 and more suitably greater than 1.2. Also, it is preferred that the boiling point of the organic solvent is less than 120 C at normal atmospheric pressure and more suitably less than 100 C. Furthermore, the latent heat of evaporation of the organic solvent is desirably greater than 200 kJ/kg and more desirably greater than 300 kJ/kg. It is also desired that the solubility of the organic solvent in water at room temperature is less than 5 g/100 mL and more suitably less than 2 g/100 mL.

The concentration of the organic soluble polymer in the organic solvent is suitably between 5 wt % and 40 wt % and the concentration of the fluorocarbon surfactant is most suitably less than 1.0 wt % based on the weight of the organic soluble polymer, preferably from 0.05 to 0.5% and more preferably 0.05 to 0.2% based on the concentration of polymer.

The cast solution of the organic soluble polymer and the fluorocarbon surfactant in the organic solvent is most suitably exposed to humid air in a humidity chamber where the relative humidity is controlled between 40 and 95%. After evaporation of the organic solvent and the condensed water droplets, the resulting hemispherical surface cavity structured polymer film preferably has a surface fluorine content between 2 and 20 atom % and more suitably between 3 and 10 atom %.

The use of a fluorocarbon surfactant, along with other material selections and process conditions in accordance with the above descriptions, has been found to be particularly effective for enabling formation of a first structured film having a high fill factor (greater than 80%, preferably greater than 85%) of relatively small (less than 20 micrometer, preferably 1-10 micrometer diameter) cavities for use as a mold in forming a microlens array for use in the invention.

The first structured polymer film may be annealed in air by heating to a temperature close to or above the Tg of the major component of the copolymer or polymer blend. Upon annealing in dry air, the lower surface energy hydrophobic component preferentially migrates to the surface to modify the top surface of the first structured film to a hydrophobic surface. A film with surface cavities and hydrophobic surface is obtained in this manner. The hydrophobic top surface exhibits improved nonstick properties and can be used as a mold having low surface energy. While cavities are preferably initially formed in the first structured film with hemispherical shapes (having a mean cavity depth to diameter ratio of greater than 0.30, preferably greater than 0.35 and most preferably greater than 0.40), such cavities may become slightly less hemispherical upon annealing.

Where PDMS and BPAC are employed as hydropobic and hydrophilic components, respectively, the degree of hydrophobicity may be expressed as an atomic ratio of Si/C at the surface where the ratio is 0.5 maximum for all PDMS at the surface ($Si(CH_3)_2$) and maximum hydrophobicity and the ratio is 0.0 for no silicon at the surface. Si/C ratios of less than 0.3 may be regarded as relatively hydrophilic while ratios of 0.3 or greater may be regarded as relatively hydrophobic.

A second fluid polymer composition may be coated over the mold, cured and released to form the microlens array. The hydrophobic top surface of the mold allows a variety of hydrophilic (and high surface energy) materials to be easily released from it. Suitable materials for the second fluid polymer composition are ultraviolet (UV) curable materials such as UV curable acrylates, urethanes and urethane acrylate oligomers. Examples of such materials are NOA 68 and NOA 72 from Norland Products Inc., AC PR-153, AC PR-155, AC PR-157 and AC PR-157-S5 from Addison Clear Wave and CN 968 from the Sartomer Company Inc. Particularly suitable are fluid polymer compositions that after curing and release result in a second structured film having a refractive index greater than 1.45, an elastic modulus greater than 1000 kPa and optical transmission greater than 80%. More desirable are fluid polymer compositions that after curing and release result in a second structured film having a refractive index greater than 1.5, an elastic modulus greater than 10,000 kPa and optical transmission greater than 85%. Most desirable are fluid polymer compositions that after curing and release result in a second structured film having refractive index greater than 1.5, an elastic modulus greater than 100,000 kPa and optical transmission greater than 90%. It is desired that the refractive index of the second structured film is closely matched to that of a transparent glass substrate or cover through which light is emitted from a light emitting device (e.g., where the refractive index of the second structured film is within 0.05, preferably within 0.03, and most preferably within 0.01 of the refractive index of the cover or substrate through which light is emitted). Preferably, the microlens array is adhered to the transparent substrate or cover through which light is emitted with an optical adhesive having a relatively high refractive index, which is also closely matched to that of the transparent substrate or cover.

The described method enables formation of a second structured film having a first flat side and a second side having a high fill factor (greater than 80%, preferably greater than 85%) of relatively small (less than 20 micrometer, preferably 1-10 micrometer diameter) microlenses corresponding to the cavities formed in the first structured film mold. The microlenses formed in the second structured film in accordance with the process of the invention are close-packed to provide the high fill factor, but disordered or randomly distributed. The degree of disorder in the film is evident in the Fraunhofer diffraction pattern that is exhibited by the film when the film is placed before a source of laser light. The diffraction patterns exhibited by the random micro-lens array films employed in the invention when illuminating the micro-lens array with a beam of light typically comprise one or more distinct concentric rings, whereas the diffraction patterns of films comprising an ordered array of lenses will be in the form of individual bright points. The phenomenon of Fraunhofer diffraction is described more fully by Lisensky et al. Journal of Chemical Education, vol. 68, February 1991. When used in a pixellated flat-panel display device, it is important that the distribution of microlenses is random at the scale of a pixel in the display for the desirable effects of the invention to be apparent to the viewer. Pixel sizes in typical displays range from 50 µm×50 µm to 300 µm×300 µm. The process of the present invention advantageously enables close packed microlenses providing a high fill factor wherein the microlenses are randomly distributed over such a corresponding 300 µm×300 µm area of the second structured film.

The microlens array of the second structured film formed in the method of the present invention can be integrated into a light-emitting device such as a flat-panel pixellated display by adhering the flat side of the second structured film to either a transparent cover or substrate of the light emitting device through which light is emitted. In a preferred embodiment, the light-emitting element is an OLED comprising first and second electrodes and one or more layers of organic light-emitting material formed between the electrodes, wherein at least one electrode comprises a transparent electrode and is positioned between the organic layers and the transparent substrate or cover through which light is emitted.

The present invention may also be practiced with either active- or passive-matrix light emitting devices. It may also be employed in display devices or in area illumination devices. In a preferred embodiment, the present invention is employed in a flat-panel OLED device composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device, including both active- and passive-matrix OLED displays having either a top- or bottom-emitter architecture. While the invention is described primarily with respect to organic light emitting diode devices, it is not limited to such OLED devices, and may also be employed with other self-emissive light-emitting devices such as inorganic LEDs.

A typical structure according to a prior art device is shown in FIG. 1. OLED 100 in FIG. 1 includes transparent glass substrate 110.2, anode 110.3, hole-injecting layer (HIL) 120, hole-transporting layer (HTL) 130, exciton-blocking layer (XBL) 140, light-emitting layer (LEL) 150, electron-transporting layer (ETL) 170, electron-injecting layer (EIL) 180 and cathode 190. OLED 200 shown in FIG. 2 is the same as OLED 100, except that there is a microlens array layer 210.1 (microlens array layer 1) disposed on the side of the transparent glass substrate 110.2 opposite to the device side. A structure according to one embodiment of the present invention is shown in FIG. 3. OLED 300 is the same as OLED 100, except that there is a microlens array layer 310.1 (microlens array layer 2) disposed on the side of the transparent glass substrate 110.2 opposite to the device side. The microlens array layer 310.1 is fabricated in accordance with the present invention. OLEDS 100, 200, and 300 can be operated by applying an electric potential produced by a voltage/current source between the pair of the electrodes, anode 110.2 and cathode 190. Light generated inside the devices emits through the transparent glass side. The composition of each organic layer in the OLEDs can be as taught in the prior art.

The micro-lens array of the present invention provides improved diffusion of ambient light. This is advantageous when concentrated intense light sources such as the sun or incandescent lamps are incident on the display. The specular reflections of such sources detract from the quality of the viewed image. Furthermore, the disordered nature of the micro-lenses in the present invention serves to minimize undesirable diffractive effects from such concentrated intense light sources, which create bright reflected spots or rings that are distracting to the viewer.

Most OLED devices are sensitive to moisture or oxygen, or both, so they are commonly sealed in an inert atmosphere such as nitrogen or argon, along with a desiccant such as alumina, bauxite, calcium sulfate, clays, silica gel, zeolites, alkaline metal oxides, alkaline earth metal oxides, sulfates, or metal halides and perchlorates. Methods for encapsulation and desiccation include, but are not limited to those described in U.S. Pat. No. 6,226,890 issued May 8, 2001 to Boroson et al. In addition, barrier layers such as $SiO_x(x>1)$, Teflon, and alternating inorganic/polymeric layers are known in the art for encapsulation.

OLED devices can employ various well-known optical effects in order to enhance their properties if desired. This includes optimizing layer thicknesses to yield maximum light transmission, providing dielectric mirror structures, replacing reflective electrodes with light-absorbing electrodes, providing anti-glare or anti-reflection coatings over the display, providing a polarizing medium over the display, or providing colored, neutral density, or color conversion filters over the display. Filters, polarizers, and anti-glare or anti-reflection coatings may be specifically provided over the cover or as part of the cover.

EXAMPLES

The following examples are presented for a further understanding of the present invention. During the fabrication of OLEDs, the thickness of the organic layers and the doping concentrations were controlled and measured in situ using calibrated thickness monitors built in an evaporation system (Made by Trovato Mfg., Inc., Fairport, N.Y.). The EL characteristics of all the fabricated devices were evaluated using a constant current source (KEITHLEY 2400 SourceMeter, made by Keithley Instruments, Inc., Cleveland, Ohio) and a photometer (PHOTO RESEARCH SpectraScan PR 650, made by Photo Research, Inc., Chatsworth, Calif.) at room temperature and 1.0 mA/cm$^2$. The color was reported using Commission Internationale de l'Eclairage (CIE) coordinates.

EXAMPLE 1

Microlens Array

This example illustrates a method of preparation of a microlens array employed in accordance with an embodiment of the invention.

Figure 6:
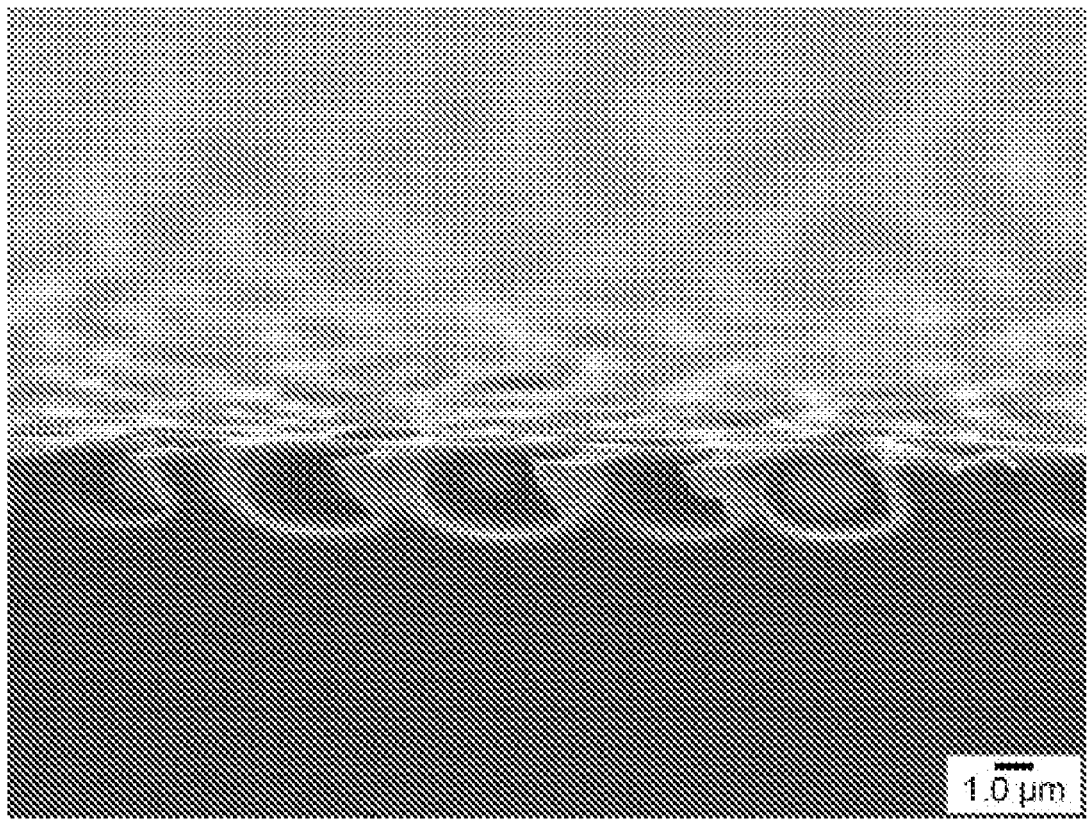
FIG. 6 shows an image of the cross-section of the first structured polymer film prior to annealing in an embodiment of the invention.
Figure 7:
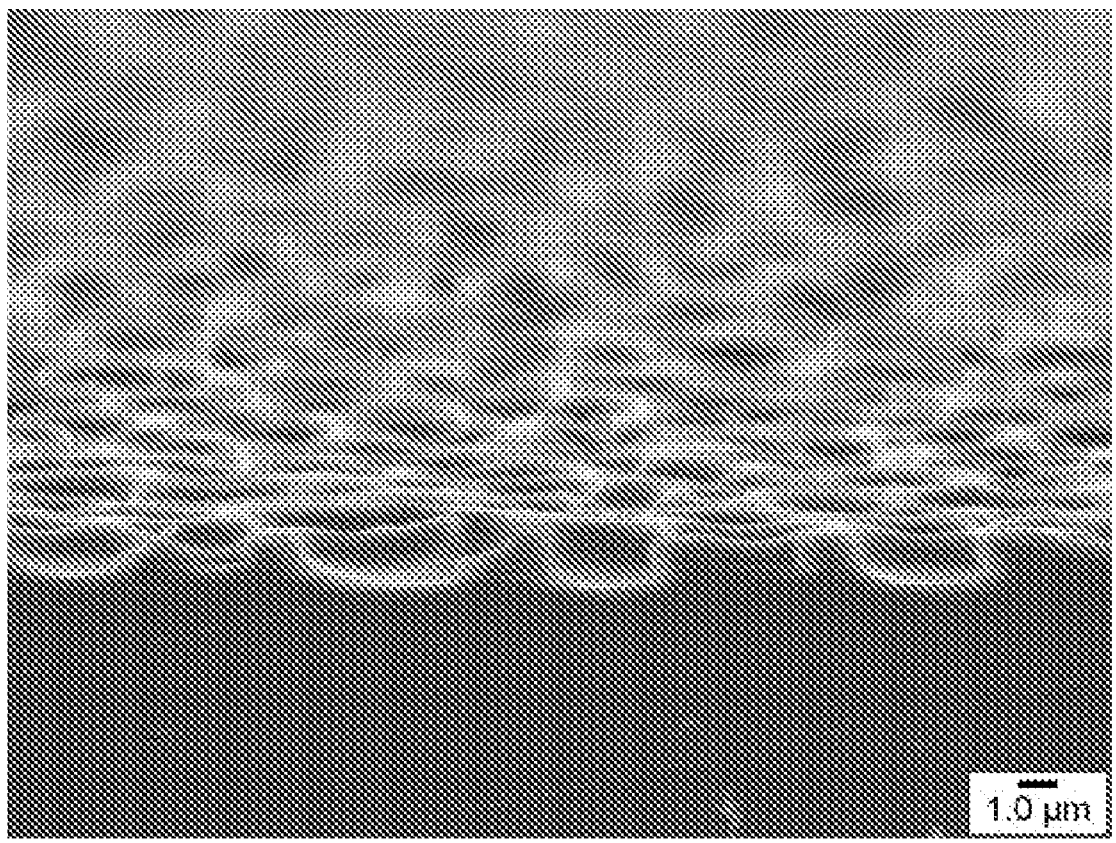
FIG. 7 shows an image of the cross-section of the first structured polymer film after annealing in an embodiment of the invention.

A solution containing 20 wt % of a copolymer of bisphenol A polycarbonate (BPAC) and polydimethylsiloxane (PDMS) (49.5 mol % bisphenol A, 50 mol % polycarbonate and 1 mol % PDMS; average molecular weight of 92,000 and 31 repeat units of dimethylsiloxane in each PDMS block) and 0.1% FC431 fluorocarbon surfactant (based on the weight of polymer) in methylene chloride was applied on the vinylidene chloride subbed surface of a sheet of polyethyleneterephthalate (PET) at a wet thickness of 0.25 mm. The wet coating was then immediately inserted into a closed chamber where the temperature and humidity were controlled at 22 C and 65% RH and kept there for 5 minutes. After evaporation of the organic solvent, the sheet was kept in the chamber for an additional 5 minutes and the chamber was purged with nitrogen gas to remove residual water. The dried polymer film was peeled off the PET substrate. The film was structured with closely packed hemispherical cavities. The film was annealed for 30 minutes in a heated environment maintained at 120 C. Analysis of the first 34 angstroms of the surface of the film before and after heating by X-ray photoelectron spectroscopy (XPS) showed that the ratio of the atom % silicon to the atom % carbon had increased from 0.26 to 0.32 indicating a higher fraction of the more hydrophobic PDMS at the surface of the film after annealing. Examination of the cavities in the film before and after heating by scanning electron microscopy (SEM) showed that the original hemispherical shaped cavities were shallower after heating (FIG. 6 and FIG. 7).

Figure 8:
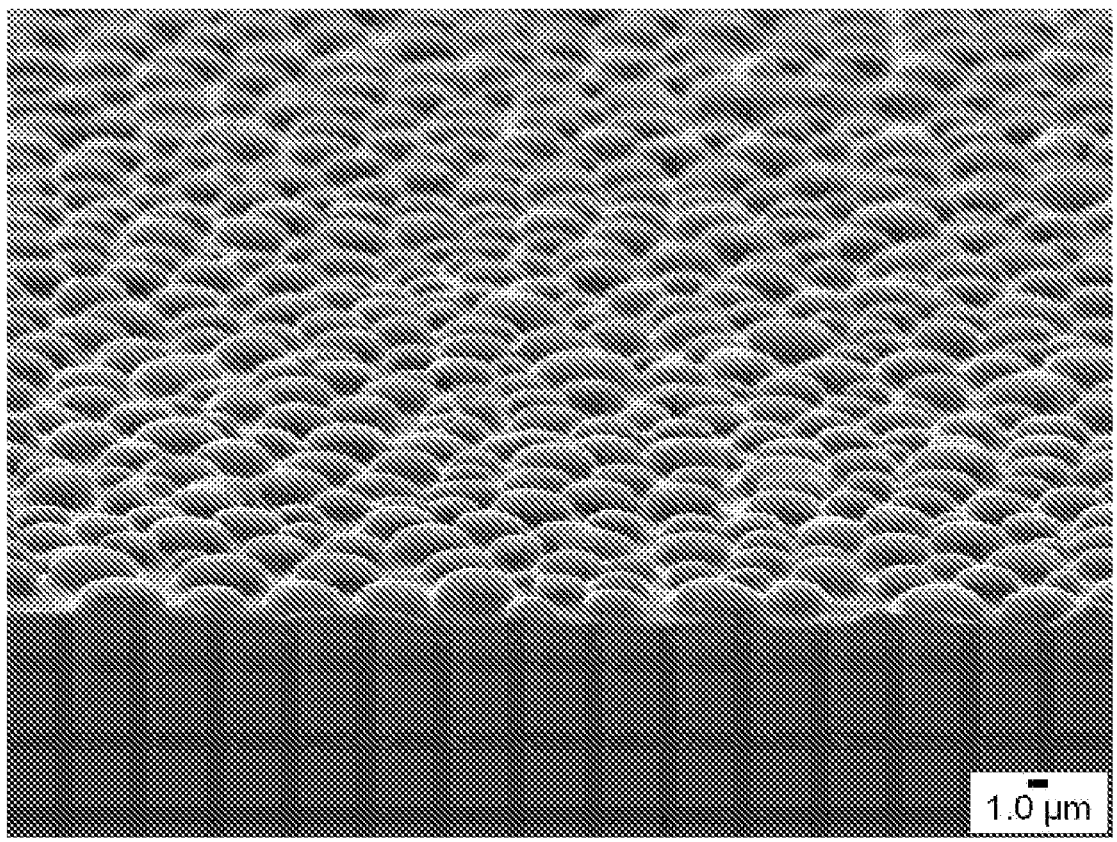
FIG. 8 shows an image of the cross-section of the second structured polymer film or microlens array in an embodiment of the invention.

A UV curable polyurethane material NOA 68 was then applied to the surface of the micro-voided film at a wet thickness of 0.2 mm and subsequently cured using UV radiation of 1.0 joule/cm$^2$. The hydrophilic cured material (water contact angle of 70 degrees) was easily peeled off the mold to provide a random array of microlenses of refractive index 1.54 that is close to that of the glass substrate of an OLED device (1.52) and relatively high elastic modulus (138,000 kPa). FIG. 8 shows an SEM of the microlens array film. Examination of the film using laser light showed a ring diffraction pattern characteristic of a random pattern of microlenses.

A control experiment was done with a first structured film that had not been annealed. It was found that in this case the hydrophilic second polymer composition could not be released from the first structured film after it had been cured.

EXAMPLE 2

Microlens Array

This example illustrates preparation of a microlens array employed in a comparative example.

A solution containing 23.8 wt % polycarbonate (Bayer DPI 1265) and 0.1% FC431 fluorocarbon surfactant (based on the weight of polycarbonate) in dichloromethane was applied on the surface of a sheet of polyethyleneterephthalate (PET) at a coverage of 452 cm$^3$/m$^2$. The wet coating was then immediately inserted into a closed chamber where the temperature and humidity were controlled at 22 C and 85% RH and kept there for 5 minutes. After evaporation of the organic solvent, the sheet was kept in the chamber for an additional 5 minutes and the chamber was purged with nitrogen gas to remove residual water. The resulting dried polymer film was then peeled off the PET substrate. The film was structured with closely packed hemispherical cavities. Sylgard 184 silicone elastomer base (from Dow Coming Corporation) was combined with Sylgard curing agent (also from Dow Coming) in a 10:1 weight ratio. The mixture was applied at a coverage of 151 cm$^3$/m$^2$ to the surface of the hemispherical cavities structured polymer film at 22 C. The elastomer was then cured in contact with the mold by heating to 100 C for one hour. The cured elastomer film (with surface energy of 23 dynes/cm, aqueous contact angle of 105° and refractive index of 1.41) with the imprint of the mold was released from the mold by peeling off to create the micro-lens array.

EXAMPLE 3

Comparative Device

The preparation of a conventional OLED (Device 1) is as follows: A ~1.1 mm thick glass substrate (refractive index 1.52) coated with a transparent indium-tin-oxide (ITO) conductive layer was cleaned and dried using a commercial glass scrubber tool. The thickness of ITO is about 100 nm and the sheet resistance of the ITO is about 30 Ω/square. The ITO surface was subsequently treated with oxidative plasma to condition the surface as an anode. A layer of CF$_x$, 1 nm thick, was deposited on the clean ITO surface as the anode buffer layer by decomposing CHF$_3$ gas in an RF plasma treatment chamber. The substrate was then transferred into a vacuum deposition chamber for deposition of all other layers on top of the substrate. The following layers were deposited in the following sequence by evaporation from a heated boat under a vacuum of approximately 10$^{-6}$ Torr:
  a) a hole-injecting layer (HIL), 10 nm thick, including hexaazatriphenylene hexacarbonitrile (HAT-CN);
  b) a hole-transporting layer (HTL), 75 nm thick, including N,N'-di-1-naphthyl-N,N'-diphenyl-4,4'-diaminobiphenyl (NPB);
  c) an excition-blocking layer (XBL), 10 nm thick, including 4-(9H-carbazol-9-yl)-N,N-bis[4-(9H-carbazol-9-yl)phenyl]-benzenamine (TCTA);

d) a light-emitting layer (LEL), 20 nm thick, including 2,2',2"-(1,3,5-phenylene)tris[1-phenyl-1H-benzimidazole] (TPBI) as a host material and including tris(1-phenylisoquinoline) iridium (III) (Ir(piq)$_3$) as a dopant material, wherein the dopant concentration in the LEL is about 4% by volume;

e) an electron-transporting layer (ETL), 15 nm thick, including 4,7-diphenyl-1,10-phenanthroline(Bphen);

f) an electron-injecting layer (EIL), 40 nm thick, including Bphen doped with 0.8% lithium by volume; and g) a cathode: approximately 100 nm thick, including Al.

After the deposition of these layers, the device was transferred from the deposition chamber into a dry box (made by VAC Vacuum Atmosphere Company, Hawthorne, Calif.) for encapsulation. The OLED has an rectangular emission area of 2.66 cm$^2$.

Figure 4:
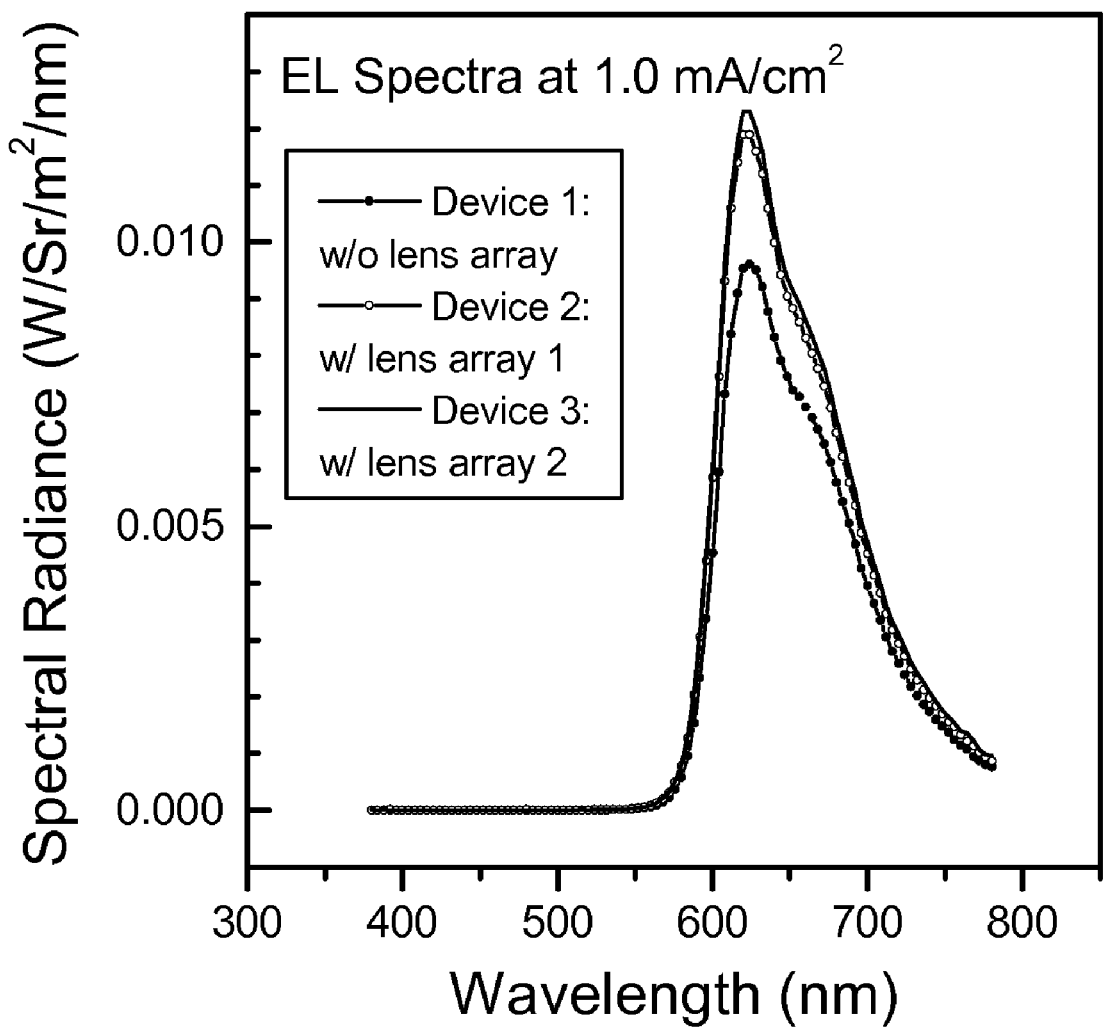
FIG. 4 shows the EL spectra of Devices 1, 2, and 3 of Examples 3, 4, and 5 tested at 1.0 mA/cm$^2$.
Figure 5:
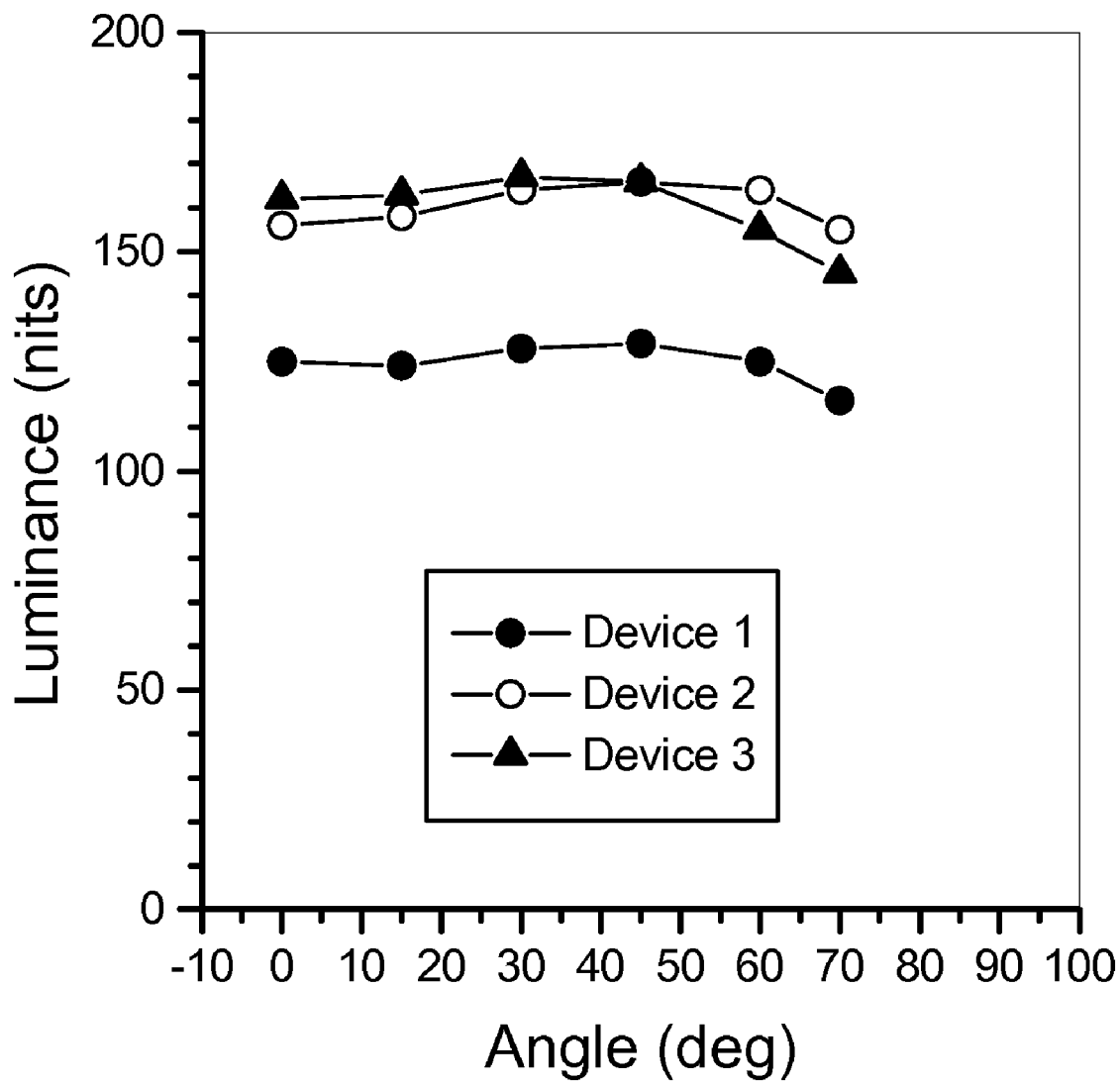
FIG. 5 shows the angular dependent luminescence of Devices 1, 2, and 3 Examples 3, 4, and 5 tested at 1.0 mA/cm$^2$.

Device 1 is denoted as: Glass/ITO/10 nm HAT-CN/75 nm NPB/10 nm TCTA/20 nm TPBI:4% Ir(piq)$_3$/15 nm Bphen/40 nm Bphen:0.8% Li/100 nm Al. The EL performance of the device is summarized in Table 1 and its EL spectrum is shown in FIG. 4. The angular dependent luminance of the device is shown in FIG. 5.

EXAMPLE 4

Comparative Device

Another OLED (Device 2) is the same as Device 1 of Example 3, except that a microlens array layer prepared as described in Example 2 (with refractive index 1.41) is attached to the glass surface as shown in FIG. 2.

Device 2 is denoted as: Microlens array layer 1/Glass/ITO/10 nm HAT-CN/75 nm NPB/10 nm TCTA/20 nm TPBI:4% Ir(piq)$_3$/15 nm Bphen/40 nm Bphen:0.8% Li/100 nm Al. The EL performance of the device is summarized in Table 1 and its EL spectrum is shown in FIG. 4. The angular dependent luminance of the device is shown in FIG. 5.

EXAMPLE 5

Invention Device

Another OLED (Device 3) is the same as Device 1 of Example 3, except that a microlens array layer formed in accordance with the present invention as described in Example 1 (with refractive index 1.54, closely matched to that of the device glass substrate) is attached to the glass surface as shown in FIG. 3.

Device 3 is denoted as: Microlens array layer 2/Glass/ITO/10 nm HAT-CN/75 nm NPB/10 nm TCTA/20 nm TPBI:4% Ir(piq)$_3$/15 nm Bphen/40 nm Bphen:0.8% Li/100 nm Al. The EL performance of the device is summarized in Table 1 and its EL spectrum is shown in FIG. 4. The angular dependent luminance of the device is shown in FIG. 5.

Comparing to Device 2, the light output of Device 3 having a new microlens array layer is improved, even though the microlenses of the comparison film formed in Example 2 where hemispherical while the cavities formed in the first structured film after heating were shallower than the original hemispherical shaped cavities formed in the film before heating (as noted in Example 1).

TABLE 1

| Example (Type) | Voltage (V) | Luminance (cd/m$^2$) | Luminous Efficiency (cd/A) | CIE x CIE y (1931) | Power Efficiency (lm/W) | EQE* (%) | ΔEQE** (On-Axis) | ΔEQE*** (Integrated) |
|---|---|---|---|---|---|---|---|---|
| 3 (Comp) | 3.7 | 125 | 12.5 | 0.673 0.326 | 10.7 | 15.3 | | |
| 4 (Comp) | 3.7 | 156 | 15.6 | 0.671 0.328 | 13.3 | 18.3 | 19.6% | 28% |
| 5 (Inv) | 3.7 | 163 | 16.3 | 0.671 0.328 | 14.4 | 19.0 | 24.2% | 29.3% |

*On-axis external quantum efficiency (EQE)
**ΔEQE (On-Axis) = (EQE of device 2 or 3 − EQE of device 1)/EQE of device 1 (on-axis)
***ΔEQE (Integrated) is a integrated value of ΔEQE from 0 to 90 degree related to on-axis.

The invention has been described in detail with particular reference to certain preferred embodiments thereof, but it will be understood that variations and modifications can be effected within the spirit and scope of the invention.

The invention claimed is:

1. A light-emitting device, comprising:
   a light emitting element on a first side of a transparent substrate or cover through which light is emitted; and
   a microlens array on a second side, opposite to the first side, of the transparent substrate or cover though which light is emitted;
   wherein the microlens array has a refractive index greater than 1.45 and an elastic modulus of at least 1,000 kPa and comprises individual microlenses having a mean diameter of less than 20 micrometers that are randomly distributed over 300 μm×300 μm areas of the microlens array.

2. A light emitting device according to claim 1, wherein the device comprises a pixellated flat-panel display device, and where the individual micro-lenses of the array are randomly distributed at the scale of a pixel in the display device.

3. The light emitting device of claim 1, wherein the microlens array has a microlens fill factor greater than 0.80.

4. The light emitting device of claim 1, wherein the device comprise, in order, a transparent glass substrate through which light is emitted, a first transparent electrode on a first side of the substrate, one or more layers of organic light-emitting material, and a second electrode, and wherein the microlens array is on a second side, opposite to the first side, of the transparent substrate, and has an refractive index within 0.05 of the refractive index of the glass substrate.

5. The light emitting device of claim 4, wherein the microlens array has an refractive index within 0.03 of the refractive index of the glass substrate.

6. The light emitting device according to claim 5, wherein the elastic modulus of the second structured film is at least 10,000 kPa.

* * * * *